US005868496A

United States Patent [19]
Spitzberg

[11] Patent Number: 5,868,496
[45] Date of Patent: Feb. 9, 1999

[54] NON-CONTACT SURFACE TEMPERATURE, EMISSIVITY, AND AREA ESTIMATION

[75] Inventor: Richard M. Spitzberg, Sharon, Mass.

[73] Assignee: Massachusetts Institute of Technology, Cambridge, Mass.

[21] Appl. No.: 818,278

[22] Filed: Mar. 17, 1997

Related U.S. Application Data

[63] Continuation of Ser. No. 267,883, Jun. 28, 1994, abandoned.

[51] Int. Cl.$^6$ ........................................................ G01J 5/00
[52] U.S. Cl. .................................. 374/128; 374/9; 374/45; 374/129; 374/6; 364/557; 364/564; 250/339.04
[58] Field of Search .................................... 374/6, 9, 126, 374/128, 129, 142, 45; 250/339.02, 339.04, 339.09; 364/550, 557, 560, 564; 356/43, 45

[56] References Cited

U.S. PATENT DOCUMENTS

| | | | |
|---|---|---|---|
| 4,647,774 | 3/1987 | Brisk et al. | 374/128 |
| 4,790,669 | 12/1988 | Christensen | 374/131 |
| 4,840,496 | 6/1989 | Elleman et al. | 374/126 |
| 4,880,314 | 11/1989 | Kienitz | 374/129 |
| 4,881,823 | 11/1989 | Tanaka et al. . | |

(List continued on next page.)

OTHER PUBLICATIONS

Anderson, A.S., "An Improved Radiometer for Temperature Measuring of the Aluminum Surface," *Adv. Instrument*, 40:1337–1345, (1985). No Month.

Tsai, B.K., et al., "Dual–Wavelength Radiation Thermometry: Emissivity Compensation Algorithms," *International Journal of Thermophysics*, 11(1):269–281, (1990). No Month.

Khan, M.A, et al., "Noncontact temperature measurement. II. Least squares based techniques," *American Institute of Physics*, 62(2):403–409, (1991). No Month.

Tank, V., et al., "Multispectral Infrared Pyrometer for Temperature Measurement With Automatic Correction of the Influence of Emissivity," *Infrared Physics*, 30(4):331–342, (1990). No Month.

Pellerin, et al., "Multispectral Radiation Thermometry for Aluminum Alloys," *ASME*, HTD–vol. 162, pp. 43–47, (1991). No Month.

*Primary Examiner*—Diego F. F. Gutierrez
*Assistant Examiner*—Andrew Hirshfeld
*Attorney, Agent, or Firm*—Lappin & Kusmer LLP

[57] ABSTRACT

Method and apparatus for non-contact temperature, emissivity and area estimation for gray and non-gray (uniform and non-uniform surface emissivity) are disclosed. Optical power measurements are obtained for radiation from a surface of interest in multiple wavelength bands. These power measurements are used to generate an expression for surface emissivity as a function of unknown temperature and surface projected area. At each of series of trial temperatures and areas within a predetermined range of physically plausible values, a value for emissivity at each measured wavelength is obtained. A best fit between these emissivity data points and a selected model emissivity function is obtained by least-squares minimization. The trial temperature and area which yield both the smallest minimum sum of squares and an emissivity value within predetermined physical constraints are concluded to be the temperature and projected surface area. An expression for the emissivity of the surface as a function of wavelength is also thus obtained. The invention applies as well for the case when the surface of interest has a known area. The invention includes a means of correcting for reflected background radiation by modeling it as part of the measured optical power at each measurement wavelength. Optical power measurements are taken in the environment of the surface from a calibration source having a known temperature and known emissivity characteristics, thus allowing the background radiation source effects to be characterized and excluded from the temperature estimation.

35 Claims, 8 Drawing Sheets

U.S. PATENT DOCUMENTS

| | | |
|---|---|---|
| 4,924,478 | 5/1990 | Tank . |
| 4,984,902 | 1/1991 | Crowley et al. .......................... 374/128 |
| 5,099,121 | 3/1992 | Allen .......................................... 374/9 |
| 5,132,922 | 7/1992 | Khan et al. . |
| 5,166,080 | 11/1992 | Schietinger ............................. 374/121 |
| 5,188,458 | 2/1993 | Thompson et al. ..................... 374/121 |
| 5,231,595 | 7/1993 | Makino et al. .......................... 374/126 |
| 5,305,417 | 4/1994 | Najm et al. .............................. 374/126 |
| 5,481,112 | 1/1996 | Marui et al. ................................ 374/9 |
| 5,490,728 | 2/1996 | Schietinger et al. .................... 374/128 |

NON-CONTACT SURFACE TEMPERATURE, EMISSIVITY, AND AREA ESTIMATION

This is a continuation of application Ser. No. 08/267,883 filed on Jun. 28, 1994, now abandoned.

GOVERNMENT SUPPORT

This invention was made with government support under Contract Number F19628-90-C-0002 awarded by the Air Force. The government has certain rights in the invention.

BACKGROUND OF THE INVENTION

The ability to measure surface temperature quickly and efficiently for both near and distant surfaces without making contact with the surface is key to many scientific, engineering and industrial applications. In industries as diverse as steel, aluminum and integrated circuit manufacturing, it is necessary to control and monitor surface temperatures to absolute accuracies of a few degrees. Contact techniques, though most accurate in principle, are often limited by geometry, physical constraints, and the time it takes for the thermal sensors to equilibrate with the surface of interest, as well as errors due to conductive heat flow.

Other engineering and scientific applications may, in addition, require a simultaneous estimate of the surface emissivity and of the size (projected area) of a distant unresolved point target.

Methods that rely on measuring the optical radiation from a surface and relating it to the surface temperature have been used for many years. Generally known as pyrometric techniques, these methods are based on Planck's law of radiation. The main problem with traditional pyrometric techniques is that they need information about the surface spectral emissivity to ultimately relate the measured optical radiation to the actual surface temperature. This is the case whether the measurements are made in only one or in many optical wavelength passbands. Spectral emissivity data is generally difficult to measure and, even when known to some extent, is likely to deviate from the original measurements due to the processes that the material in question is undergoing, as well as oxidation, aging, etc. In addition, most materials are non-gray, that is, the spectral emissivity of the material varies with wavelength, and it may also vary with time.

Another problem with pyrometric techniques has to do with the necessity for compensating for other background radiation sources in the area of the surface of interest. For the case when one is dealing with surfaces which are highly reflective, that is, having low emissivity, the radiation emitted by background sources will combine with the self-emitted surface radiation. Since only the self-emitted radiation contains information related to the surface temperature, it is necessary to compensate for reflected background radiation.

Techniques based on measuring the optical radiation in a single wavelength band are conceptually the simplest of all. However, in relating the measurements to temperature they lack the well-known leverage gained by measuring radiation at several wavelengths. Techniques that employ two or more bands are further subject to spectral variation in the emissivity.

Those techniques that employ many bands, known as multi-wavelength pyrometry, are of two types. One type approximates the Planck distribution by Wien's law to reduce the problem of determining temperature to a linear estimation problem. By using Wien's approximation, however, the technique is limited in the range of wavelengths where the measurements may be carried out for a given range of surface temperatures.

The second type uses the Planck distribution itself, thus posing the problem of estimating temperature as the non-linear estimation problem it actually is. Here, as in the linear technique above, it is necessary to assume a model functional dependence between the spectral emissivity and wavelength. The surface temperature and the coefficients that ultimately determine the emissivity are determined simultaneously by non-linear least squares estimation procedures that perform a fit to the optical data using the specific model. Earlier methods suffer from several disadvantages. They do not account and compensate for background reflected radiation, and they generally require optical measurements in a large number of sensor bands. It is claimed that the statistics involved with fitting a large number of data points using a model with a relatively small number of degrees of freedom will compensate for measurement error. While this might indeed be the case, the practical problem of measuring at a large number of wavelength bands, along with the complexity of non-linear search techniques, makes these procedures too complicated and too slow for many industrial requirements where speed and simplicity are of the essence. An implementation of one such technique also appears to be very sensitive to the presence of noise in the measurements.

SUMMARY OF THE INVENTION

The present invention is directed to an apparatus and method for estimating physical parameters of a surface without contacting the surface. In one embodiment, the surface fills the field of view (FOV) of a radiation sensor or optical sensor of the apparatus, and the invention can estimate the emissivity and temperature of the surface. For the case where the target is an unresolved point target at a known distance from the apparatus, the invention is capable of simultaneously estimating the temperature, surface emissivity and the target size, which is the surface projected area as seen by the sensor. The radiation sensor or optical sensor of the invention is preferably a multi-band radiometer which includes multiple radiation detectors, each of which detects radiation having wavelengths within a single corresponding wavelength band. Each detector generates a signal indicative of the total power of the radiation received within its corresponding wavelength band.

The optical power in radiation from a surface which fills the FOV of the optical sensor is a known function of the temperature and emissivity of the surface. It is also known that the emissivity of typical surfaces varies with the wavelength of the radiation emitted. In the present invention, by substituting the known measured power at each wavelength band into the known function of power with respect to emissivity, and by compensating for the known background radiation, an expression for the emissivity of the surface as a function of temperature at each wavelength band is obtained. Thus, for each wavelength band, an emissivity function in only a single variable, namely, temperature, is obtained.

The present invention compares these measured emissivity expressions at each of a series of trial temperatures within a constrained temperature range with a preselected model expression for emissivity of the surface as a function of radiation wavelength. The model emissivity expression is obtained by one of several possible approaches. One approach uses a power series expansion. Another approach uses a sum of orthogonal polynomials such as Chebyshev polynomials or Legendre polynomials. In another approach most useful in metals, the emissivity is assumed to follow a power law of wavelength where the power of the leading term is predicted by theory to be approximately $-(\frac{1}{2})$, i.e., the emissivity is assumed to be an inverse square root function of wavelength. Each of these model expressions includes unknown constant coefficients or parameters in addition to the independent variable wavelength.

The invention uses a least squares minimization curve fitting approach to fit the measured emissivity values at each wavelength band and trial temperature to the model emissivity function. At each wavelength band, the model emissivity function is subtracted from the measured emissivity as a function of temperature. Since for each wavelength band the wavelength is a known quantity, the result is a difference function in the variable T, temperature, and also in the unknown coefficients of the model emissivity expression. The invention performs a constrained search over the predetermined range of temperatures to determine the unknown constant coefficients required in the model expression to generate a least sum of squares of the difference functions at each wavelength.

For the case when the surface of interest fills the FOV of the optical sensor, the surface projected area is automatically known given information regarding the size of the collecting aperture of the optical sensor and the angular subtense of its FOV. Then the parameters of interest are the surface temperature and the surface emissivity.

The constrained search of the invention is performed at temperatures between a minimum temperature limit $T_{min}$ and a maximum temperature limit $T_{max}$, selected to represent the physically realistic minimum and maximum limits of surface temperature. The constrained search begins at $T_{min}$. It is substituted into the sum of squared difference functions such that the only remaining unknowns are the unknown constant coefficients in the model emissivity function. Based on the number of available equations it is possible to solve uniquely for the unknown coefficients of the model emissivity that minimize the sum-of-squared differences at $T_{min}$. Thus there is a specific value of the sum-of-squared differences, as well as specific values for the unknown coefficients associated with the temperature $T=T_{min}$. Next, the temperature is incremented by some small temperature $\Delta T$ and the process of solving for the unknown coefficients and the numerical value of the sum-of-squared differences associated with this new temperature $T_{min}+\Delta T$, is repeated. This process continues until $T_{max}$ is reached. At this point the temperature associated with the deepest local minimum of all of the sum-of-squared differences is identified as the surface temperature if the corresponding computed spectral emissivity of the surface falls within preselected physically realistic limits. These limits can be chosen by the user to be $0<\epsilon(\lambda)<1$, or some other $\epsilon_{min} \leq \epsilon(\lambda) \leq \epsilon_{max}$, as appropriate for the problem at hand, where $\epsilon(\lambda)$ is the spectral emissivity of the surface as a function of wavelength. Otherwise the temperature and spectral emissivity associated with the next deepest local minimum are tentatively chosen as the final solution assuming that the spectral emissivity satisfies the above criteria. This continues until the criterion imposed on the spectral emissivity is met, whereupon, that temperature, and the spectral emissivity are chosen as the final solution. occasionally it may happen that no physically acceptable solution is found, either due to measurement error, or because the trial model for emissivity is not adequate. In that case it may be necessary to conduct more careful measurements or to re-evaluate the choice of emissivity model.

For the case when the target appears as an unresolved point target in the optical sensor FOV it is also possible to estimate the target size, i.e., the projected surface area as seen by the optical sensor. The procedure used is identical to that described above except that the search is conducted for $T_{min} \leq T \leq T_{max}$ and $A_{min} \leq A \leq A_{max}$, where A is the target projected surface area. The search now becomes a two dimensional search using increments $\Delta T$ and $\Delta A$ to span the range. When the deepest local minimum that satisfies the constraints on the spectral emissivity is found then the associated T, A, and $\epsilon(\lambda)$ are selected as the final solutions.

By proper selection of a model emissivity function, the system of the invention can accomplish accurate temperature measurements using very few wavelength bands and therefore very few detectors. In the case of a power series expansion or sum of orthogonal polynomials, the model expression typically includes two unknown constant coefficients. Therefore, the sum of squares of the difference functions between the measured emissivity and the model emissivity includes three unknowns, namely, temperature and the two coefficients. Thus, when a temperature is selected and substituted into the expression, only three wavelength bands are needed to perform the least squares minimization process. In the case of metals such as relatively pure aluminum the expression for emissivity may be simplified so as to contain a single unknown coefficient by expressing the spectral emissivity, $\epsilon(\lambda)$, as a power law of wavelength, $\lambda$, with an undetermined amplitude, a, and a known power, $-(\frac{1}{2})$, e.g., $\epsilon(\lambda)=a\lambda^{-\frac{1}{2}}$. Then only two wavelength bands, i.e., two different detectors, are needed. The inverse square root behavior is based on predictions from the Hagen-Rubens emissivity relation for metals. If the appropriate power is not known, then it is possible to use an optical sensor which uses three different detectors, each measuring the optical radiation in three distinct wavelength bands, and use the more general model $\epsilon(\lambda)=a\lambda^b$, where both unknown coefficients a, b, can be determined with the procedure described above.

Some prior systems used power measurements at many wavelengths, e.g., over one hundred bands, to perform non-contact temperature measurement. As a result, implementation of the present invention in hardware is considerably less expensive than prior systems. The dual-band radiometer used in one embodiment of the invention is commercially available and relatively inexpensive.

The temperature estimation technique of the invention also compensates for the effects of background radiation sources. Since only surface self-emitted radiation provides surface temperature information, radiation from external background sources reflected to the sensor by the surface of interest can cause inaccuracies in the non-contact temperature measurement. To eliminate these inaccuracies, the method of the invention first performs a calibration procedure to quantify the total background radiation in the area of the surface before actually performing temperature measurement. This is done by replacing the surface of interest with a calibration plate or surface which has a known emissivity characteristic and a geometry similar to that of the surface of interest. The plate is then brought to a known temperature, and an optical power reading of the surface is taken by the sensor. Since the emissivity and temperature of the calibration plate are known, the portion of the measurement attributable to self emissions of the plate is readily identified. The remaining power is then attributed to background sources. With the background radiation sources thus quantified, background radiation effects are a known quantity in the temperature estimation procedure, and therefore the procedure can and does account for them.

Because the present invention compensates for background radiation effects, it is operable over a wider range of temperatures and wavelengths than prior systems which do not, since those that do not compensate for background radiation may require a substantial contrast between the temperature of the surface of interest and the temperature of the background. To illustrate, in most processing environments, the background temperature is at about room temperature (~300°K.), and therefore most background radiation is at long infrared wavelengths. If the surface of interest is at room temperature, the detectors used must respond to these long IR wavelengths. Since prior systems do not compensate for background effects, the power readings obtained from the surface cannot be apportioned between surface self-emissions and background reflections, and inaccurate surface temperature estimates result. Consequently, the operational temperature ranges of these systems is typically limited to higher temperatures so shorter wavelength detectors can exclude the effects of room temperature background sources.

In contrast, the present invention provides accurate temperature estimates even where the temperature of the background and the temperature of the surface are similar. Because the portion of a surface optical power measurement attributable to background effects is known, it can be eliminated from the measurement, leaving only surface self-emission effects. This is true regardless of any difference or similarity in wavelength between the reflected background radiation and the emitted surface radiation.

Also, the constrained search used by the invention allows the temperature (and area) estimation to be made relatively quickly and in a robust manner since each search variable is allowed to vary only over a physically meaningful range. By contrast, unconstrained minimization methods based on gradient search techniques used in prior art allow the parameters to vary freely and rely on the initial starting point of the search to be close enough to the actual solution so that the technique will converge.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
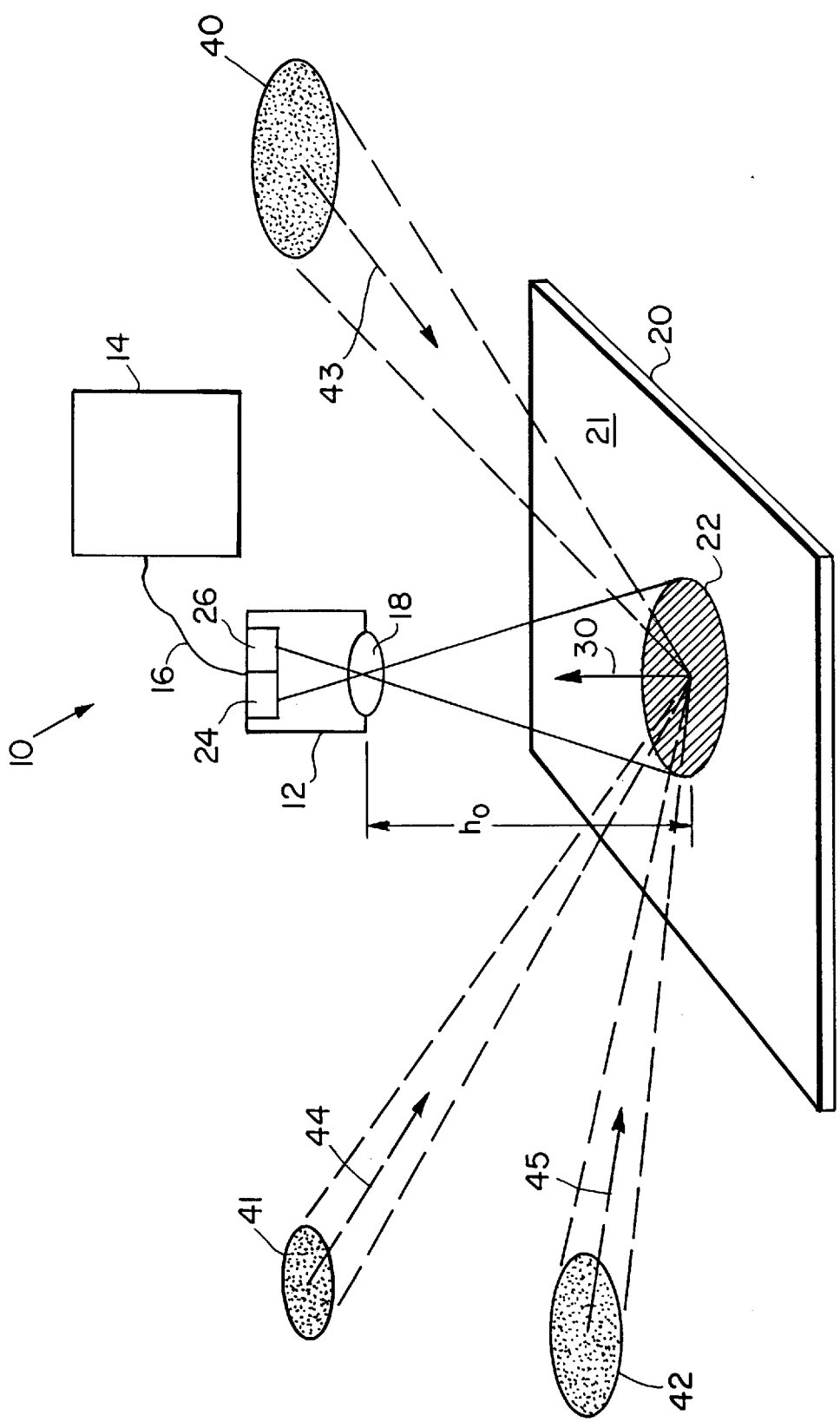
FIG. 1 is a schematic representation of the temperature estimation apparatus of the invention used to estimate temperature of a surface.

The method and apparatus of the invention are based on applying a closed form expression for the optical signal from radiating surfaces in the presence of other unavoidable but well characterized sources of background radiation. In an industrial environment, such unavoidable background sources can be excluded from the sensor field of view by appropriate design, but often they still serve as a source of nuisance background radiation via stray reflections off the surface of interest and into the measurement sensor. The optical signal model of the present invention includes these sources of background radiation, and the estimation technique compensates for them.

A model expression for the total optical power $P_M(\lambda)$ of radiation from the surface of interest arriving at the collecting aperture of an optical sensor such as a multiband radiometer is given by:

$$P_M(\lambda)=A_C[A_O/h_O^2][\epsilon_M(\lambda)N(\lambda,T_O)+(1-\epsilon_M(\lambda))f_1 U_1(\lambda)]; \quad (1)$$

where $P_M(\lambda)$=total optical power at wavelength $\lambda$ (watts/$\mu$m),
$\lambda$=wavelength of measured radiation ($\mu$m),
$A_C$=area of collecting aperture (m$^2$),
$h_O$=distance between collecting aperture and surface of interest (m),
$A_O$=area of surface of interest (M$^2$),
$T_O$=temperature of surface of interest (°K.),
$\epsilon_M(\lambda)$=model surface hemispherical spectral emissivity at wavelength $\lambda$ (dimensionless),
$N(\lambda,T)$=radiance at wavelength $\lambda$ due to Planck distribution for a blackbody at temperature $T_O$ (watts/m$^2$-sr-$\mu$m),
$f_1$=view factor for reflected background radiation (dimensionless), and
$U_1(\lambda)$=radiance at wavelength $\lambda$ due to background source (watts/m$^2$-sr-$\mu$m).

The term $\epsilon_M(\lambda)N(\lambda,T_O)$ in equation 1 represents the self-emission by the surface of interest, and the term $(1-\epsilon_M(\lambda))f_1 U_1(\lambda)$ accounts for the background radiation reflecting from that same surface. Equation 1 assumes that there is only one source of background radiation. For the case where there is more than one such source $f_1 U_1(\lambda)$ is replaced by a sum over all such sources: $fU(\lambda)=f_1 U_1(\lambda)+f_2 U_2(\lambda)+f_3 U_3(\lambda)+ \ldots$.

In equation 1 the term $A_O/h_O^2=\Omega_O$ is the field of view in steradians of the collecting optics. Here it is assumed that the surface of interest entirely fills the field of view of the optical sensor.

For a flat surface filling the sensor FOV in the presence of a uniform, localized background source of radiation, the view factor for the reflected radiation due to the source i is given by $f_i=[A_i/h_i^2]/(2\pi)=\Omega_i/(2\pi)$. That is, the background radiation due to source i, of projected area $A_i$, and at distance $h_i$ from $A_O$, incident at $A_O$, is proportional to the projected angular subtense of that background source at $A_O$. That incident radiation is then scattered according to the hemispherical surface reflectance $(1-\epsilon(\lambda))$ into the $2\pi$ steradians of the hemisphere visible to elements of the flat surface. Of that scattered radiation the amount incident on the sensor collecting aperture is proportional to the solid angle that the collecting aperture $A_C$ subtends at $A_O$, given by $A_C/h_O^2$. If the background source of radiation subtends the entire hemisphere above the flat surface then $f_i=1$.

For a convex, unresolved point target in the optical sensor FOV, in the presence of a source of background radiation (not in the FOV) $f_i=[A_i/h_i^2]/(4\pi)=\Omega_i/(4\pi)$ because now the reflected radiation can scatter into a full sphere.

To apply this model it is required to characterize all the background radiation sources insofar as their geometry relative to the surface of interest is concerned, as well as to their equivalent individual blackbody radiances. Now, each of the individual background sources can itself be modelled as a blackbody ($\epsilon=1$) at a characteristic temperature $T_i$, which is chosen to satisfy $$U_i(\lambda) = N(\lambda, T_i); \quad (2)$$

where $$N(\lambda, T_i) = \frac{2c_1}{\lambda^5 [\exp(c_2/\lambda T_i) - 1]}, \quad (3)$$

$C_1$=first radiation constant $5.95 \times 10^7$ watts-$\mu$m$^4$/m$^2$-sr, and $C_2$=second radiation constant 14,388 $\mu$m-°K.

From a practical point of view, the sum of terms $f_1 U_1(\lambda) + f_2 U_2(\lambda) + f_3 U_3(\lambda) + \ldots$ may be measured directly by placing a calibration surface (of known surface emissivity $\epsilon(\lambda)$, and at a known temperature) in place of the surface of interest. Using equation 1 this sum of view factor-background radiance products is then obtained from measured $P(\lambda)$ data from the calibration surface.

The actual signal measured by a multiband radiometer is obtained by integrating equation 1 over the passbands of the instruments taking into account the spectral response function for each band. For the sake of simplicity it will be assumed that the response function within each band is unity and that the response falls off to zero at the endpoints, i.e., it is assumed that the wavelength bands have square response functions. Then the in-band power (watts) collected in band $\Delta\lambda$ is given by:

$$P(\Delta\lambda) = \int_{\Delta\lambda} P(\lambda) \, d\lambda. \quad (4)$$

For a sensor whose passbands are narrow it is very convenient to approximate $P(\Delta\lambda) \sim P(\lambda)\Delta\lambda$ because then the various terms in equation 1 may themselves be approximated as the Planck distribution, $N(\lambda,T)$, multiplied by the optical bandwidth $\Delta\lambda$. Thus, given a sensor capable of measuring in L distinct bands, the L measurements for each observation are modeled as $P_M(\Delta\lambda_1)$, $P_M(\Delta\lambda_2)$, ..., $P_M(\Delta\lambda_L)$.

In the present invention, the temperature estimate can be obtained for non-gray surfaces, i.e., surfaces whose emissivity varies as an unknown function of wavelength $\lambda$. To perform the estimation procedure, the method of the invention selects a model emissivity function $\epsilon_M(\lambda)$ to approximate the variation in emissivity of the surface with wavelength $\lambda$. In one embodiment, the model emissivity $\epsilon_M(\lambda)$ is expressed as a power series expanded in $\lambda$, for example $\epsilon_M(\lambda) = a + b\lambda$, such that the emissivity function contains two unknown constant coefficients or parameters a and b. In another embodiment, the surface of interest is assumed to meet the Hagen-Rubens prediction. This will be true where the material is a metal such as relatively pure aluminum. In these cases, the model emissivity expression used is $$\epsilon_M(\lambda) = \frac{a}{\sqrt{\lambda}},$$

containing only one unknown constant coefficient.

In another embodiment, the emissivity is expressed as an orthogonal set of polynomials in wavelength. Two possible sets of polynomials that lend themselves to this application are the Legendre polynomials and the Chebyshev polynomials. In this embodiment, in equation 1 the emissivity may thus be represented as $$\epsilon_M(\lambda) = \sum_{j=1}^{N} a_j P_j(\lambda) \quad (5)$$

where the $a_j$ are undetermined coefficients and the $P_j(\lambda)$ are a set of orthogonal polynomials in the free parameter $\lambda$.

The first few Legendre and Chebyshev polynomials are listed below. The first four Legendre polynomials are given by $$P_1(\lambda) = 1$$
$$P_2(\lambda) = \lambda$$
$$P_3(\lambda) = (\tfrac{1}{2})(3\lambda^2 - 1) \quad (6)$$
$$P_4(\lambda) = (\tfrac{1}{2})(5\lambda^3 - 3\lambda)$$

and the first four Chebyshev polynomials are given by $$T_1(\lambda) = 1$$
$$T_2(\lambda) = \lambda$$
$$T_3(\lambda) = 2\lambda^2 - 1 \quad (7)$$
$$T_4(\lambda) = 4\lambda^3 - 3\lambda.$$

In the mathematical literature, the convention is to have the subscripts begin with 0 rather than 1. Here the convention indicated above is used so that in equation 5, where the sum goes from j=1 to N, it is understood that the highest order polynomial is that of degree N as defined here, i.e., $P_N(\lambda)$ and that the sum contains N undetermined coefficients. Note that in using the P's or T's in equation 5 the free parameter $\lambda$ must be scaled so that the polynomials satisfy the boundary conditions at the extrema of the interval over which they are being used, namely, the range of wavelengths where the optical measurements are conducted. The use of orthogonal polynomials is particularly applicable in the case of large N. This is the case where the optical sensor can measure the optical radiation in a large number (large L) of individual spectral bands as would be the case for a spectro-radiometer. Specifically, the use of a sequence of orthogonal polynomials helps to avoid the problem of ill-conditioned matrices, which often occurs when using a power series expansion rather than an expansion in orthogonal polynomials. The inversion of a matrix, or some similar operation, is an essential part of least-squares estimation. If the matrix is ill-conditioned the inversion procedure will be very prone to measurement and round-off errors. Thus avoiding ill conditioned matrices will improve the accuracy of the procedure.

The temperature estimation technique of the invention will now be described in detail. The technique is based on a simple model for the optical signal of a non-gray target surface of interest in the presence of reflected background radiation. The key to the technique is to expand the unknown emissivity in a model expression $\epsilon_M(\lambda)$ and to perform a constrained non-linear least squares fit of the model to measured emissivity data.

The estimation process described herein can be used when the overall amplitude coefficient $$A = \frac{A_c A_o}{h_o}$$

in equation 1 is known. This is generally the case for industrial applications where the sensor collecting aperture area $A_C$, sensor field of view (FOV), $$\Omega_o = \frac{A_o}{h_o^2}$$

and the distance between the sensor and the surface of interest $h_O$ are known. Therefore, letting the term $$\frac{A_c A_o}{h_o^2}$$

of equation 1 be denoted by a known, generalized amplitude A, equation 1 can be rewritten as $$P_M(\lambda)/A = \epsilon_M(\lambda) N(\lambda, T) + (1-\epsilon_M(\lambda)) f U(\lambda). \qquad (8)$$

The term $fU(\lambda)$, which accounts for the ambient background radiation field and the geometrical configuration factor, is assumed to be known and it is henceforth replaced by the term $V(\lambda)$ for convenience. Collecting terms, equation 8 becomes $$P_M(\lambda)/A - V(\lambda) = \epsilon_M(\lambda)[N(\lambda, T) - V(\lambda)]. \qquad (9)$$

To obtain the in-band powers, it is necessary to integrate equation 9 over the appropriate band intervals. As before, it is assumed that the filter response functions for the individual bands is unity within the band and zero outside (square band assumption). If this is not the case, then an additional known wavelength-dependent term appears on the right hand side of equation 9. With the square band assumption, the in-band power in band $\Delta\lambda_i$ is given by $$P_M(\Delta\lambda_i)/A - V(\Delta\lambda_i) = \int_{\Delta\lambda_i} \epsilon_M(\lambda)[N(\lambda,T) - V(\lambda)]d\lambda. \qquad (10)$$

Considerable simplification occurs for the case of narrow spectral passbands, i.e., on the order of 1 $\mu$m. With this assumption it is possible to approximate the integrals as the value of the integrand evaluated at the center wavelength of the spectral interval, denoted as $\lambda_{ic}$, multiplied by the spectral width, $\Delta\lambda_i$. Terms such as $P(\Delta\lambda_i)$ become $P(\lambda_{ic})\Delta\lambda_i$. Equation 10 simplifies to $$P_M(\lambda_{ic})/A - V(\lambda_{ic}) = \epsilon_M(\lambda_{ic}) [N(\lambda_{ic},T) - V(\lambda_{ic})] \qquad (11)$$

and the spectral width $\Delta\lambda_i$ cancels out.

All of the terms on the left hand side of equation 11 are either measured, known, or can be estimated. On the right hand side are unknown quantities $\epsilon_M(\lambda_{ic})$ and the temperature T. Solving for $\epsilon_M(\lambda)$, equations 10 or 11 can be written as $$\epsilon_M(\lambda) = \frac{\frac{P_M(\lambda)}{A} - V(\lambda)}{N(\lambda,T) - V(\lambda)}. \qquad (12)$$

Given a set of measured power data in the L wavelength bands $P_D(\lambda_1), P_D(\lambda_2), \ldots P_D(\lambda_L)$; expression for measured emissivity $\epsilon_D(\lambda_i)$ at each wavelength band $\lambda_i$ is obtained. Equation 12 becomes $$\epsilon_D(\lambda_i) = \frac{\frac{P_D(\lambda_i)}{A} - V(\lambda_i)}{N(\lambda_i,T) - v(\lambda_i)}. \qquad (13)$$

where $P_D(\lambda_i)$ is the measured power data and $\epsilon_D(\lambda_i)$ is the corresponding measured data emissivity function. It should be noted that $\epsilon_D(\lambda_i)$ is a known function of an as yet undetermined temperature T. However, for a given trial temperature $T_T$ in a pre-determined interval $T_{min} \leq T_T \leq T_{max}$, a value for emissivity $\epsilon_D(\lambda_i)$ can be obtained.

As mentioned above, the invention estimates surface temperature T and emissivity as a function of wavelength $\epsilon(\lambda)$ by obtaining the best fit of the measured emissivity data points $\epsilon_D(\lambda_i)$ to the model emissivity function of wavelength $\epsilon_M(\lambda)$. This is done by least squares minimization by minimizing the sum of squares $$\chi^2(T) = \sum_{i=1}^{L} [\epsilon_D(\lambda_i) - \epsilon_M(\lambda_i)]^2; \qquad (14)$$

where L is the number of wavelength bands used. As described above, the model emissivity function $\epsilon_M(\lambda)$ can be a sum of orthogonal polynomials, a power series expansion, or a power law of wavelength. In the general case the power law has two undetermined coefficients, amplitude and power. For the case where the surface of interest satisfies the Hagen-Rubens emissivity relation this reduces to an undetermined amplitude and a known power such as an inverse square root of wavelength function. In the sum of orthogonal polynomials and power series, the number of terms in the expansion N is the number of degrees of freedom in the system and therefore the number of unknown coefficients in the expansion. Thus, where N=2, equation 14 has three unknowns: T and the two expansion coefficients a and b. The expression for model emissivity becomes $\epsilon_M(\lambda) = a + b\lambda$, and for L=3 equation 14 becomes $$\chi^2(T) = [\epsilon_D(\lambda_1) - (a+b\lambda_1)]^2 + [\epsilon_D(\lambda_2) - (a+b\lambda_2)]^2 + [\epsilon_D(\lambda_3) - (a+b\lambda_3)]^2$$

$$= \left[ \frac{\frac{P_D(\lambda_1)}{A} - V(\lambda_1)}{N(\lambda_1,T) - V(\lambda_1)} - (a+b\lambda_1) \right]^2 + \qquad (15)$$

$$\left[ \frac{\frac{P_D(\lambda_2)}{A} - V(\lambda_2)}{N(\lambda_2,T) - V(\lambda_2)} - (a+b\lambda_2) \right]^2 +$$

$$\left[ \frac{\frac{P_D(\lambda_3)}{A} - V(\lambda_3)}{N(\lambda_3,T) - V(\lambda_3)} - (a+b\lambda_3) \right]^2.$$

It should be noted that since N=2, two unknown parameters a and b appear in the model emissivity expression $\epsilon_M(\lambda)$, and, consequently, a minimum of three wavelength bands $\lambda_1, \lambda_2$ and $\lambda_3$, i.e, three measurements, are needed to perform the sum-of-squared differences minimization.

The estimation process of the invention proceeds by substituting trial temperatures $T_T$ into equation 15 one at a time and performing the least squares minimization to find values for parameters a and b at each temperature which minimize $\Omega^2(T_T)$. The standard approach to the least squares minimization involves taking the partial derivatives of $\Omega^2$ with respect to the undetermined coefficients a and b, and setting each of those to zero. This results in a set of linear equations which are then solved for a and b. The trial temperatures are constrained to be within a preselected range of realistic values to allow the process to be completed quickly and efficiently. Each trial temperature $T_T$ is associated with a least sum of squares $\Omega^2(T_T)$ and the pair of coefficients a and b which result in $\Omega^2(T_T)$. Each trial temperature $T_T$, and the corresponding $\Omega^2(T_T)$ and coefficients a and b are stored as a set.

After $\Omega^2$, a and b have been computed and stored for the entire temperature range, all of the values of $\Omega^2(T_T)$ are examined to identify local minima of $\Omega^2$. The temperature T* corresponding to the overall deepest local minimum of $\Omega^2(T)$ is tentatively identified as the temperature of the surface. By local minimum it is understood that $\Omega^2(T^*-\Delta T) > \Omega^2(T^*) < \Omega^2(T^*+\Delta T)$. Next, the values for the unknown parameters a* and b* which correspond to the identified temperature T* are substituted into the emissivity model expression $\epsilon_M(\lambda)=a+b\lambda_i$, and used to compute the spectral emissivity at each $\lambda_i$. The spectral emissivity is constrained to a range of physically realistic values. This may be $0<\epsilon_M(\lambda_i)<1$, or some pre-determined values $\epsilon_{min} \leq \epsilon_M(\lambda_i) \leq \epsilon_{max}$, appropriate for the particular surface. If the a*, b* associated with T* do not result in an emissivity which satisfies this condition, then this solution cannot be accepted as being physically meaningful. In that case, the search continues for the next deepest local minimum of $\Omega^2(T)$ and the process is repeated until a local minimum is found whose associated a*, b* produce an emissivity which satisfies the emissivity constraint. It may occasionally happen that no physically acceptable solution is found. In that case the measurement may be repeated to insure its accuracy or it may be necessary to re-evaluate the choice of emissivity model.

When a temperature T* is found for which $\Omega^2(T)$ is a local minimum and the emissivity falls within the required limits, the process concludes that temperature T* is the temperature of the surface. Also, the model emissivity function $\epsilon_M(\lambda)$ is completed by parameters a* and b* such that a best-fit expression for emissivity of the surface as a function of wavelength is obtained. In this case, the complete emissivity function is $\epsilon(\lambda)=a^*+b^*\lambda$.

The description illustrates the case in which the model emissivity function $\epsilon_M(\lambda)$ is a power series expansion having two unknown parameters. However, as previously described, in many applications of the invention, the surface of interest will obey an emissivity function having only a single unknown parameter. Assuming the applicability of the Hagen-Rubens emissivity relation, materials such as metals can be modeled with an emissivity function $$\epsilon_M(\lambda) = \frac{a}{\sqrt{\lambda}} . \qquad (16)$$

In this case, since only one unknown coefficient is involved, only two wavelength bands $\lambda_1$ and $\lambda_2$ are required to perform the parameter estimation of the invention. In this case, equation 15 becomes $$\chi^2(T) = \left[\epsilon_D(\lambda_1) - \left(\frac{a}{\sqrt{\lambda_1}}\right)\right]^2 + \left[\epsilon_D(\lambda_2) - \left(\frac{a}{\sqrt{\lambda_2}}\right)\right]^2 \qquad (17)$$

$$= \left[\frac{\frac{P_D(\lambda_1)}{A} - V(\lambda_1)}{N(\lambda_1,T) - V(\lambda_1)} - \frac{a}{\sqrt{\lambda_1}}\right]^2 + \left[\frac{\frac{P_D(\lambda_2)}{A} - V(\lambda_2)}{N(\lambda_2,T) - V(\lambda_2)} - \frac{a}{\sqrt{\lambda_2}}\right]^2 .$$

In this case, the minimization procedure is performed as described above to tentatively identify a T* corresponding to the overall deepest local minimum of $\Omega^2$. The associated value of a* is substituted into the emissivity model expression $$\epsilon_M(\lambda_1) = \frac{a^*}{\sqrt{\lambda_i}} .$$

to obtain the value of the spectral emissivity at each $\lambda_i$. Once again, if the emissivity is within the prescribed range of physically acceptable values, i.e., $\epsilon_{min} \leq \epsilon_M(\lambda_i) \leq \epsilon_{max}$, the process concludes that T* is the temperature of the surface.

In addition, an expression for the emissivity of the surface as a function of wavelength is computed as.

$$\epsilon(\lambda) = \frac{a^*}{\sqrt{\lambda}} .$$

If the emissivity is not within the required range, the search continues to find the next deepest local minimum of $\Omega^2(T)$ until both conditions are satisfied, and a value for surface temperature T* and an expression for the emissivity of the surface $\epsilon(\lambda)$ are obtained.

In the embodiment in which it is assumed that the surface obeys the Hagen-Rubens prediction, as described above, the model emissivity function $\epsilon_M(\lambda)$ contains only a single unknown coefficient a. The temperature estimation process of the invention requires measurements of radiation in only two wavelength bands. In this case, the invention can be implemented in hardware with minimal complexity and effort, since dual-band sensors are commercially available and relatively inexpensive. The same comments apply in an embodiment where the spectral emissivity of the materials being tested follow a known power law type of behavior. Here the assumed emissivity model takes the form $\epsilon_M(\lambda) = a\lambda^K$, where K is an input parameter chosen by the user based on information regarding the material's optical properties.

FIG. 1 is a schematic diagram of the apparatus 10 of the present invention used to sense temperature of the surface 21 of a sheet of material 20 in the presence of three sources of background radiation 40, 41, 42. The sheet of material 20 can be a metal such as aluminum or steel, a semiconductor, or other material. The material 20 is assumed to be undergoing some process in a process area, room, chamber, etc., during which process it is desired to accurately measure the temperature of the surface 21 of the material 20 in real time without contacting the surface 21. The background radiation sources 40, 41, 42 may include the warm walls of the chamber, lights, or other known sources of radiation in the area around the material 20.

As shown in FIG. 1, the system 10 of the invention includes the sensor 12 coupled to a computer or processor 14 via a cable 16 or other means. The sensor 12 collects radiation from the surface 21 of the material 20 through a collecting aperture 18 having an area $A_C(m^2)$. The collecting aperture 18 of the sensor 12 is located at a distance $h_O$ from the surface 21. It collects radiation from a region 22 of the surface 21, the region 22 having an area $A_O(m^2)$. It can be seen from FIG. 1 that the entire field of view of the sensor 12 is filled by the surface 21.

The sensor 12 includes detectors 24 and 26 which receive the radiation from the surface 21. Each detector 24 is designed to detect radiation in a particular band of wavelengths. For example, in one embodiment, detector 24 detects radiation in the range 2.0–2.6 $\mu$m, and detector 26 detects radiation in the range 4.9–5.3 $\mu$m.

In this illustration, it is assumed that the material is a metal or other material which obeys the Hagen-Rubens emissivity relation or some variant thereof. Then the emissivity of the surface 21 can be modeled by the expression $\epsilon_M(\lambda) = a\lambda^K$, where K~−0.5, and which contains only one unknown coefficient a. Therefore, only the two detectors 24 and 26 are required. In other embodiments, where other materials are monitored, the model emissivity function $\epsilon_M(\lambda)$ will contain more than a single unknown coefficient. In those embodiments, more detectors will be required. In general, in this embodiment, the number of detectors required, L, will be one more than the number of unknown coefficients, N, in the model emissivity expression $\epsilon_m(\lambda)$, that is, L=N+1. This is true both for the case where the surface of interest fills the FOV of the sensor, as well as for the case where the target appears as an unresolved point in the optical sensor FOV, and where it is also required to estimate the target size.

As previously indicated, when only two wavelength bands are monitored as shown in FIG. 1, the invention can be readily implemented using a commercially available dual-band radiometer as the sensor 12. In one embodiment, the dual-band radiometer may include commercially available hardware such as a Williamson model number 1200 (2.0–2.6 $\mu$m) together with a Williamson model 1500 (4.9–5.3 $\mu$m) to obtain the two wavelength bands indicated previously.

The detectors 24 and 26 of the sensor 12 generate electrical signals indicative of the total optical power sensed within their designated wavelength bands. These electrical signals are forwarded along cable 16 to processor 14 which processes the signals in accordance with the foregoing description to estimate the temperature of the surface 21 as well as to solve for the emissivity of the surface with respect to wavelength $\epsilon_M(\lambda)$.

FIG. 1 also illustrates that the entire field of view of the sensor 12 is not filled exclusively with radiation emitted by the surface 21. Reference numeral 30 schematically indicates the total radiation from the region 22 of the surface 21. This total radiation includes radiation emitted by the surface 21 as well as portions of radiation 43, 44, 45 from sources 40, 41, 42, respectively, which are reflected by the surface 21 to the sensor 12. Since useful temperature information can only be obtained from radiation actually emitted by the surface 21, these background effects must be compensated for in the estimation process. The present invention performs this background compensation by performing a calibration procedure before actual optical measurements are taken from the surface of interest.

The calibration procedure is performed by replacing the material 20 with a calibration material or calibration plate within the field of view of the sensor 12. Thus, for the calibration procedure, as shown in FIG. 1, reference numeral 20 refers to the calibration plate rather than the surface of interest. The calibration plate has known emissivity characteristics and a geometry similar to that of the material 20 whose temperature is to be measured. In the case described herein, since the surface 21 is flat, the calibration plate used to perform the calibration procedure is also flat. If the surface 21 had some other geometry such as a curved shape, the calibration plate would have a similar curved shape. The temperature of the calibration plate is maintained at a known value, and an optical power measurement is obtained by one of the detectors 24, 26 of the radiation from region 22 of the calibration plate. Referring to equation 1, the entire expression, with the exception of the background term $f_1U_1(\lambda)$, is known. Thus, the total background radiation source term $fU(\lambda)$ is solved for and, consequently, in equations 9–17, $V(\lambda_i)$ becomes a known term. Therefore, the amount of background radiation in the process area becomes a known quantity which can be compensated for in the estimation process.

Figure 2A:
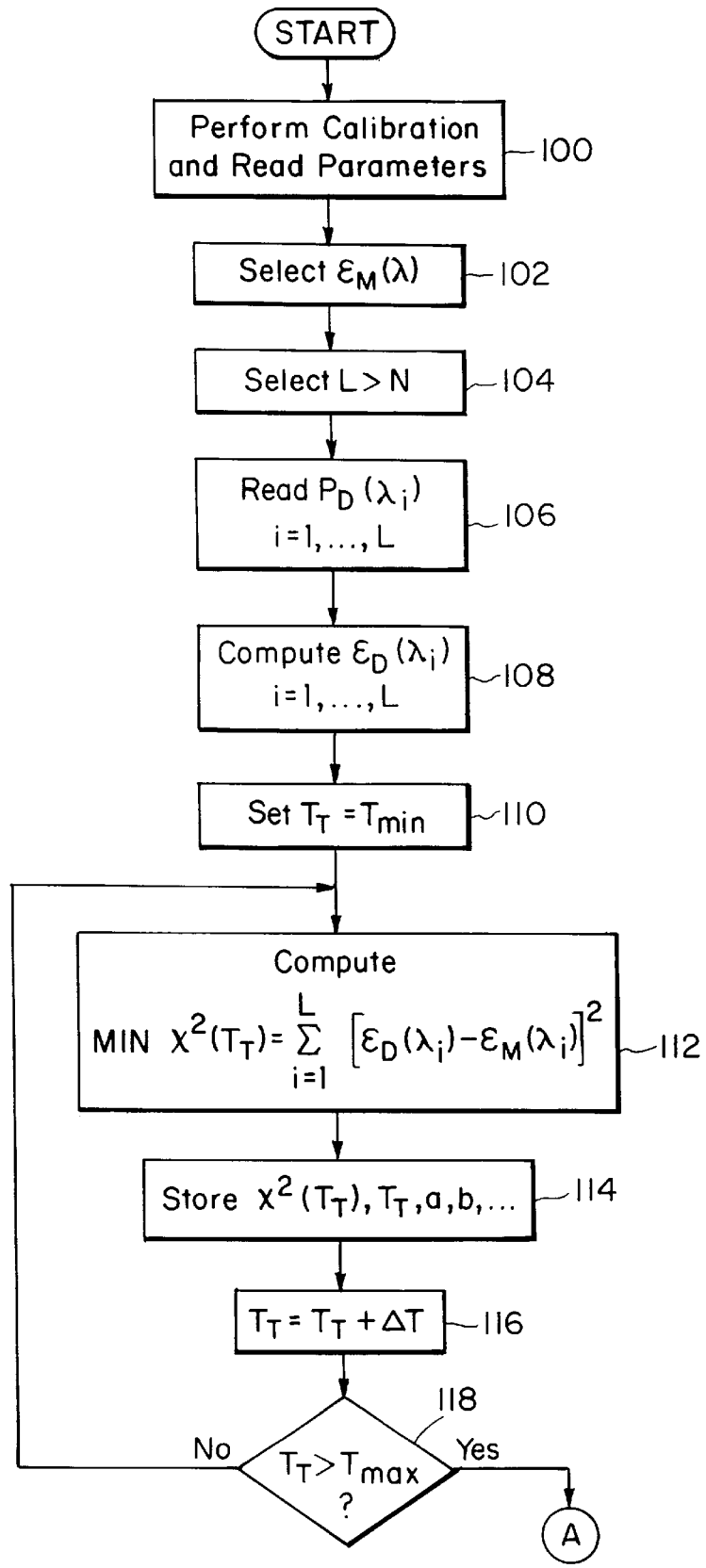
FIG. 2A and 2B contain a flowchart illustrating the logical flow of the method of the invention for the case when the surface of interest fills the FOV of the optical sensor and the area is known.
Figure 2B:
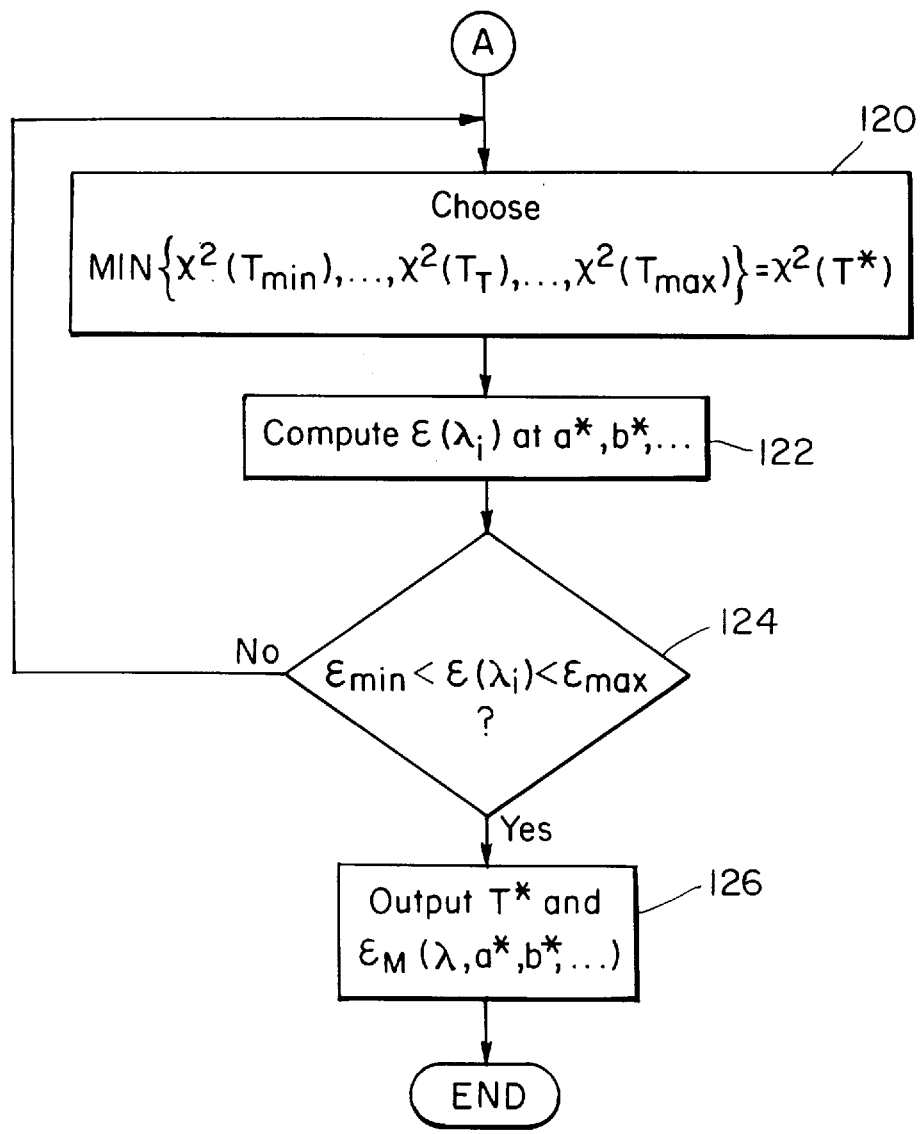

FIGS. 2A and 2B contain a flowchart illustrating the logical flow of the estimation process of the present invention. This flowchart applies for the case when the surface of interest fills the optical sensor FOV. This logical flow is controlled by software used to program the processor or computer 14 shown in FIG. 1. In the first step 100 of the process, the calibration procedure is performed and the process parameters are read. These parameters include the background radiation factor $V(\lambda)$ obtained during the calibration procedure, the temperature constraints $T_{min}$, $T_{max}$, the emissivity constraints $\epsilon_{min}$ and $\epsilon_{max}$ and the system dimensions $A_C$, $A_O$ and $h_O$. In step 102, the model emissivity function $\epsilon_M(\lambda)$ is selected. As discussed in detail above, the function can be a sum of orthogonal polynomials, a power series expansion or the inverse square root function with one unknown coefficient. In general, the selection is determined by the material whose temperature is being monitored. For example, as previously discussed, if the material is a metal such as pure aluminum, the inverse square root function closely models the emissivity behavior of the material. Next, in step 104, the number of wavelength bands L is selected to be greater than the number of unknown coefficients N in the model emissivity function $\epsilon_M(\lambda)$.

In step 106, the signals representing the optical power measurements for each wavelength band are read. In the case in which two wavelength bands are used, the signals representing $P_D(\lambda_1)$ and $P_D(\lambda_2)$ are read from their corresponding detectors. Next, in step 108, the measured data emissivity functions $\epsilon_D(\lambda_i)$ are computed in accordance with equation 13.

With both the model emissivity function $\epsilon_M(\lambda)$ and the emissivity data functions $\epsilon_D(\lambda_i)$ determined, the process of running through each trial temperature $T_T$ in the range between $T_{min}$ and $T_{max}$ is commenced. At step 110, the first trial temperature $T_T$ is set to $T_{min}$. The procedure then enters a loop in which the trial temperature $T_T$ is used as the controlling index incremented on each pass. In the first step 112 of the loop, the least sum of squares $\chi^2(T_T)$ is generated for the trial temperature. As described above, this involves computing the values of the unknown coefficients a, b, . . . , from the model emissivity function $\epsilon_M(\lambda)$ that minimize $\chi^2$. When the minimum of $\chi^2(T_T)$ is obtained, this value, along with the trial temperature $T_T$, and the corresponding unknown coefficients a, b, . . . , are stored as a set in step 114. Next, in step 116, a new trial temperature is set by incrementing $T_T$ by a preset $\Delta T$. In decision box 118, the index $T_T$ is tested to determine if it has reached the top of the temperature range $T_{max}$. If not, the loop is re-entered at step 112 to compute another least $\chi^2(T_T)$ at the new trial temperature. This process continues until the test in decision box 118 indicates that the maximum temperature $T_{max}$ has been reached.

When the entire temperature range has been tested, the procedure exits the temperature loop and enters step 120 in FIG. 2B. In step 120, each least sum of squares $\chi^2(T)$ computed and stored in steps 112 and 114 is examined to locate the deepest (smallest) local minimum of $\chi^2(T=T^*)$; that is, $\chi^2(T^*-\Delta T) > \chi^2(T^*) < \chi^2(T^*+\Delta T)$. This $T^*$ is tentatively identified as the surface temperature and the procedure moves to step 122. In step 122, the unknown coefficients $a^*, b^*, \ldots$, which were associated and stored with $T^*$ are substituted into the emissivity function at a known measured wavelength $\lambda_i$, i.e., $\epsilon_M(\lambda_i) = a^* + b^*\lambda_i$, and the expression is solved for a value of emissivity $\epsilon_i$ at each $\lambda_i$. In decision box 124, the emissivity values are tested to determine if they are within the constrained emissivity range, i.e., between $\epsilon_{min}$ and $\epsilon_{max}$. If not, the procedure returns to step 120 where the next deepest local minimum of $\chi^2(T^*)$ is selected and the process is repeated. If the emissivity values are within the constrained range, then the procedure concludes that $T^*$ is the temperature of the surface of interest. In addition, the procedure generates a complete emissivity function $\epsilon(\lambda)$ which includes the computed values a*, b*, . . . , for the unknown coefficients. Both the temperature $T^*$ and the completed emissivity expression are outputs of the procedure as shown in step 126.

The flowcharts shown in FIGS. 2A, 2B apply to the case where the surface of interest fills the field of view (FOV) of the optical sensor and the sensor collecting aperture is known. This fully determines the generalized amplitude A in Equation 8.

Figure 3A:
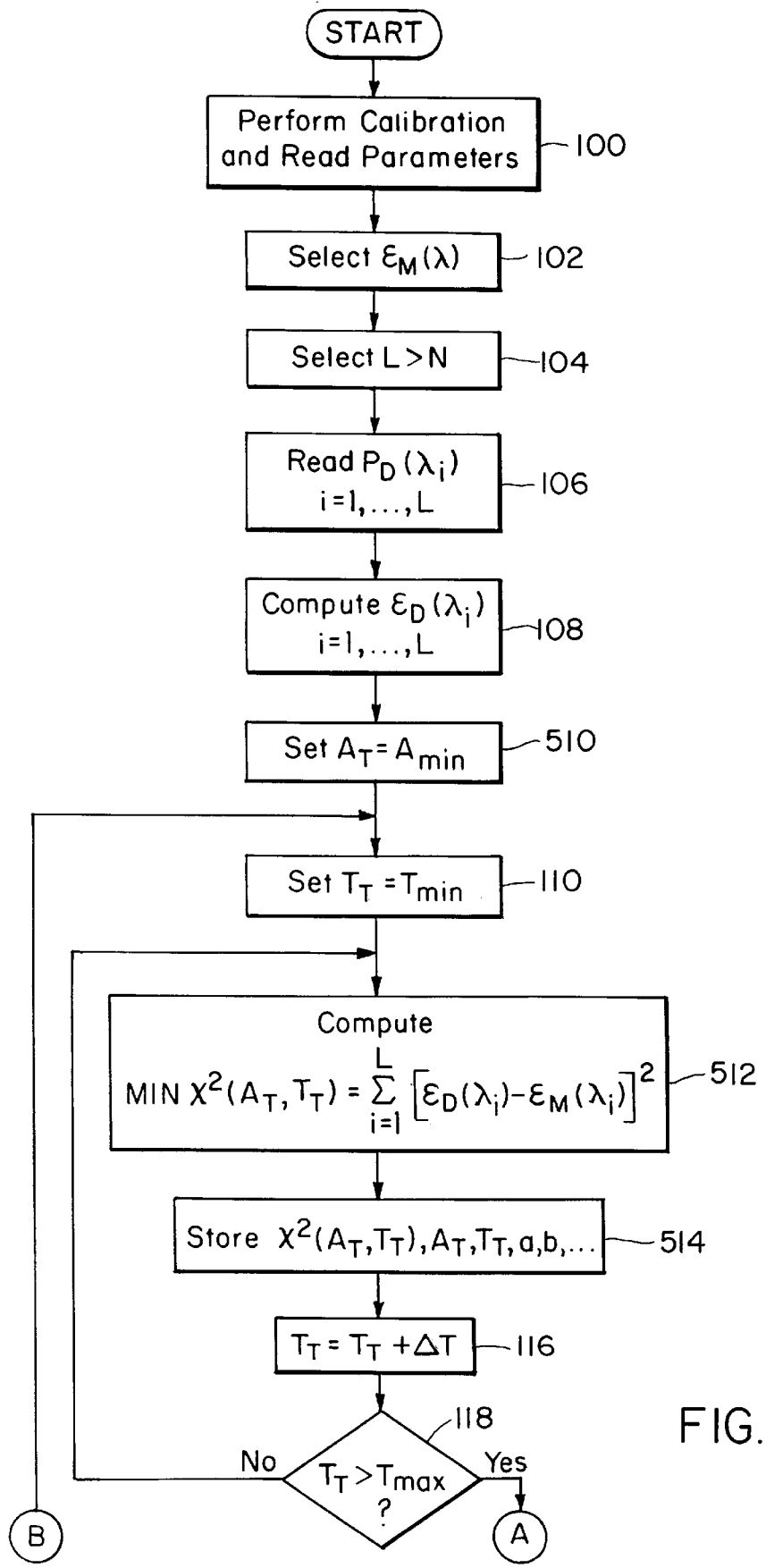
FIGS. 3A–3B contain a similar flowchart for the case of a distant, unresolved point target in the sensor FOV and where it is also required to estimate the target projected area.
Figure 3B:
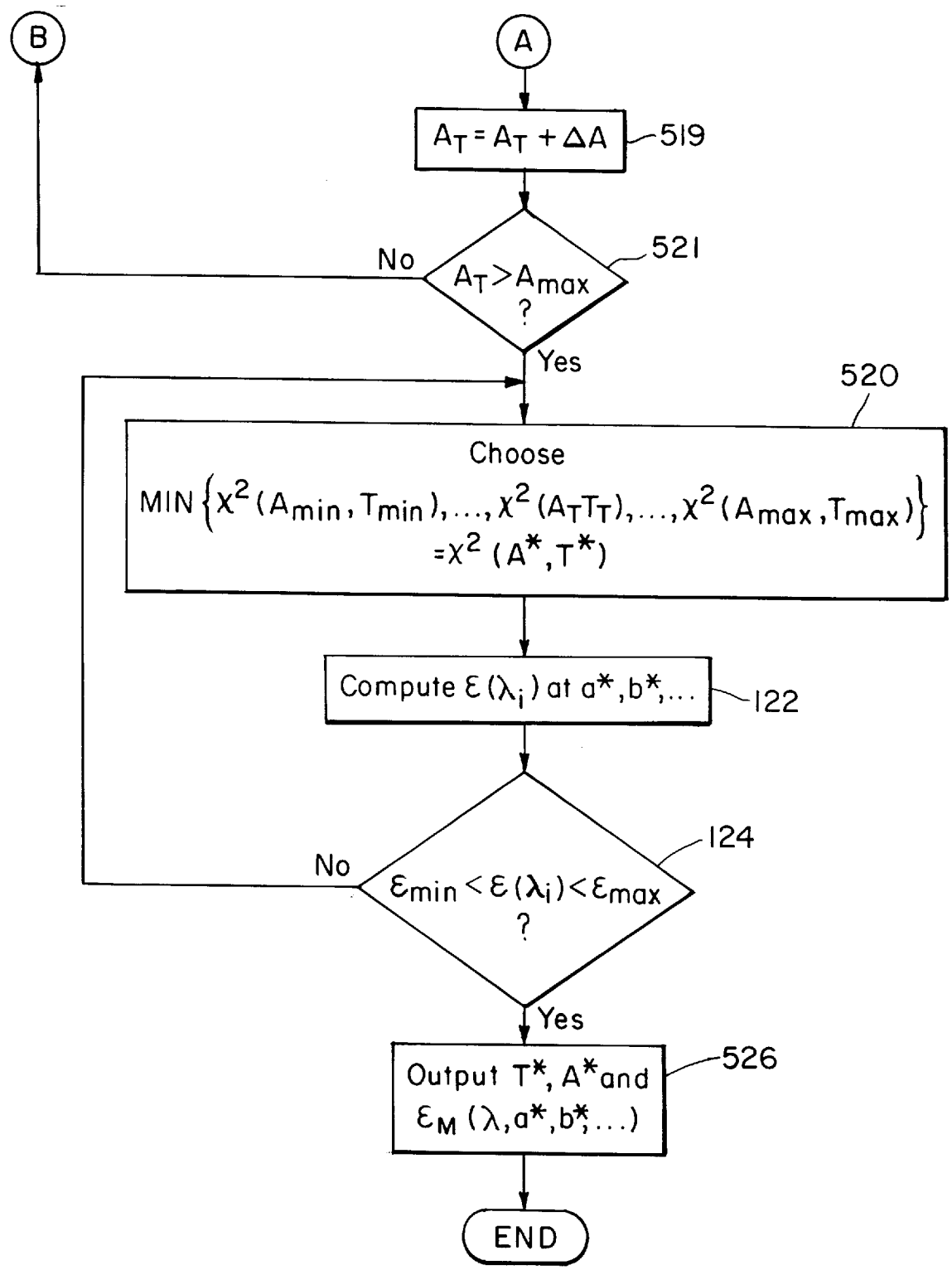

Another case of great interest for scientific, engineering, and industrial applications is where the surface of interest appears as a convex point target viewed against a cold background, which itself contributes negligibly to the optical signal measured at the sensor. The target, however, may be in the presence of some warm source of background radiation (not in the FOV) which is known or may be measured or estimated. This then suffices to estimate the term $f_1 U_1(\lambda)$ in Equation 1 as discussed earlier. Here, however, it is necessary to also estimate the target size, $A_O$, given $A_C$, and $h_O$. The procedure to estimate the target size, $A_O$, along with the target temperature, T, and its spectral emissivity $\epsilon(\lambda)$, is depicted in the flowchart shown in FIGS. 3A, 3B. It is similar to that of FIGS. 2A, 2B except that now a search for the parameter A is conducted such that $A_{min} < A < A_{max}$. The search begins by setting $A_T = A_{min}$ as in step 510 and setting $T_T = T_{min}$ as in step 110. Note that now $\chi^2 = \chi^2(A, T)$; thus, each time a $\chi^2$ is computed and stored in steps 512 and 514 it is now associated with an $A_T$, $T_T$, a, b, . . . . The procedure continues incrementing $T_T$ by $\Delta T$ until $T > T_{max}$ as in step 118. When this condition is satisfied we increment $A_T$ by $\Delta A$ as in step 519 and repeat the search over the interval $T_{min} < T_T < T_{max}$ with $A_T = A_T + \Delta A$. This continues until the condition $A > A_{max}$ is satisfied in step 521.

In choosing a local minimum for $\chi^2(A^*, T^*)$, (step 520) it is now necessary to satisfy the condition $\chi^2(A^* - \Delta A, T^* - \Delta T) > \chi^2(A^*, T^*) < \chi^2(A^* + \Delta A, T^* + \Delta T)$. Each trial local minimum is tested to determine whether it satisfies the emissivity condition as in step 124. The deepest local minimum that satisfies step 124 is accepted as the final solution $A^*$, $T^*$, $\Delta_M(\lambda)$ using the computed values of a*, b*, . . . , etc. These are the outputs of step 526.

Figure 4A:
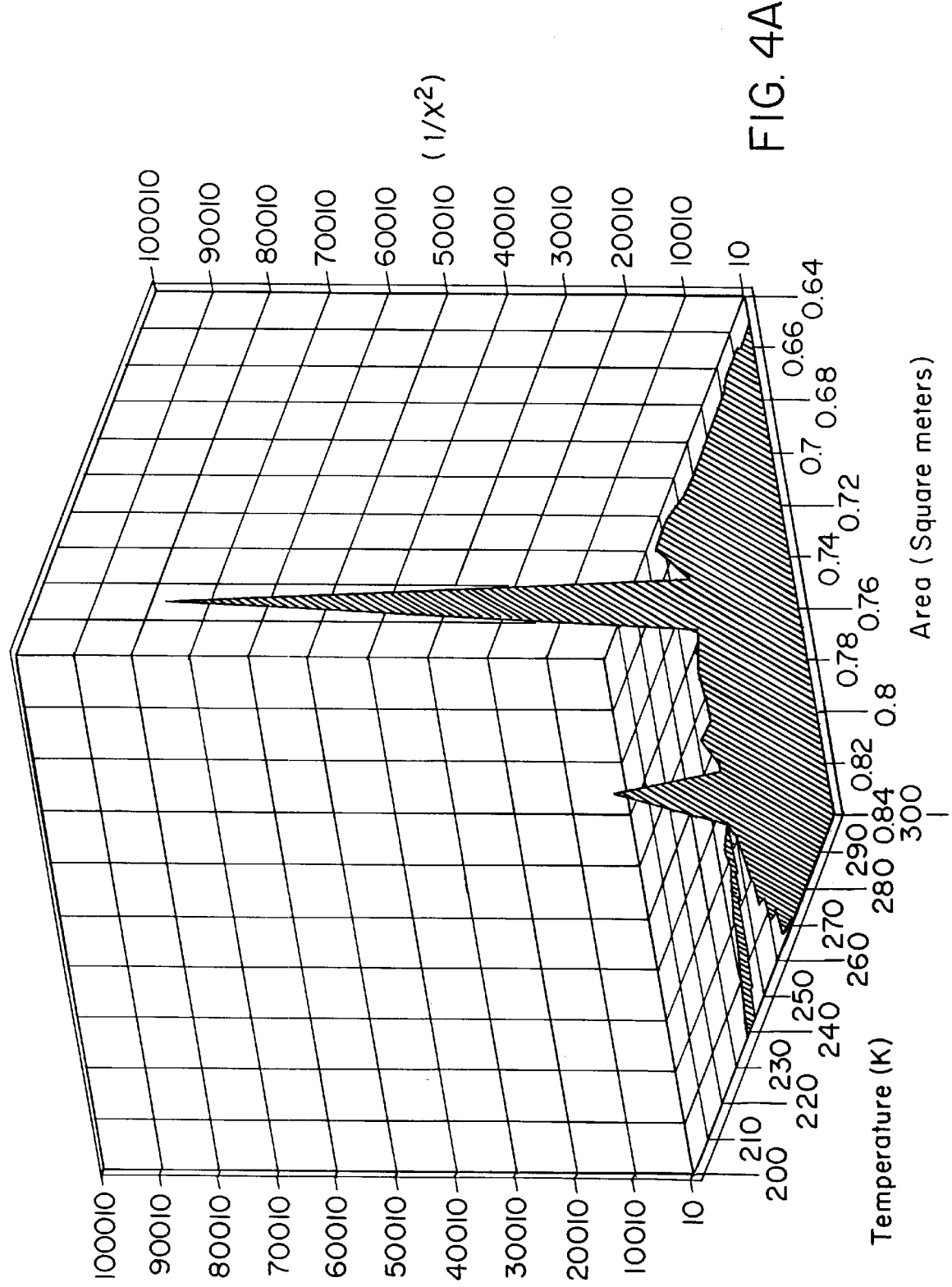
FIG. 4A shows the surface associated with $\chi^{-2}(A,T)$, i.e., the inverse of $\chi^2(A,T)$. Localized peaks of $\chi^{-2}(A,T)$ are equivalent to local minima of $\chi^2(A,T)$.
Figure 4B:
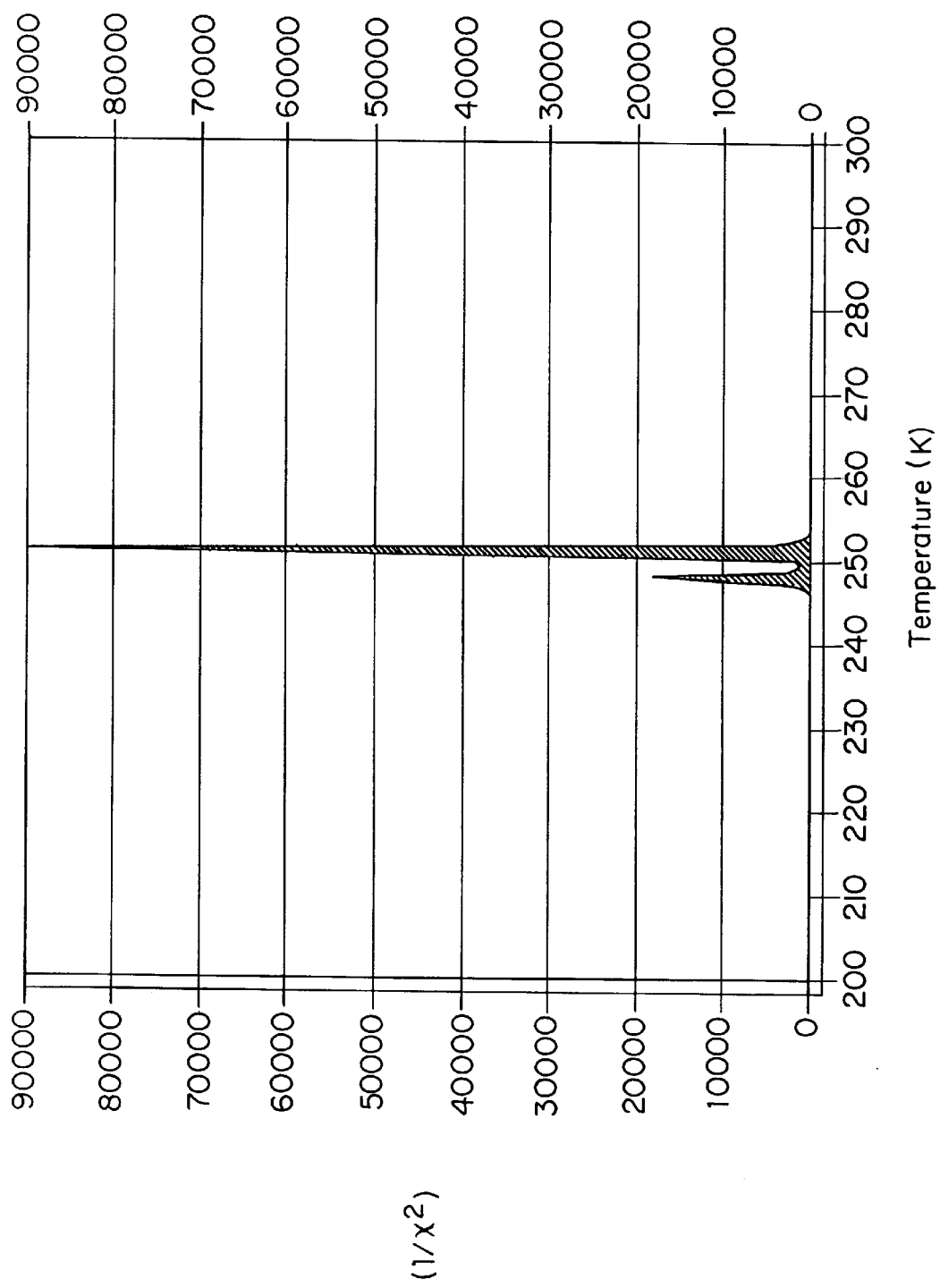
FIGS. 4B and 4C are projections of this surface onto the temperature and area axes respectively.
Figure 4C:
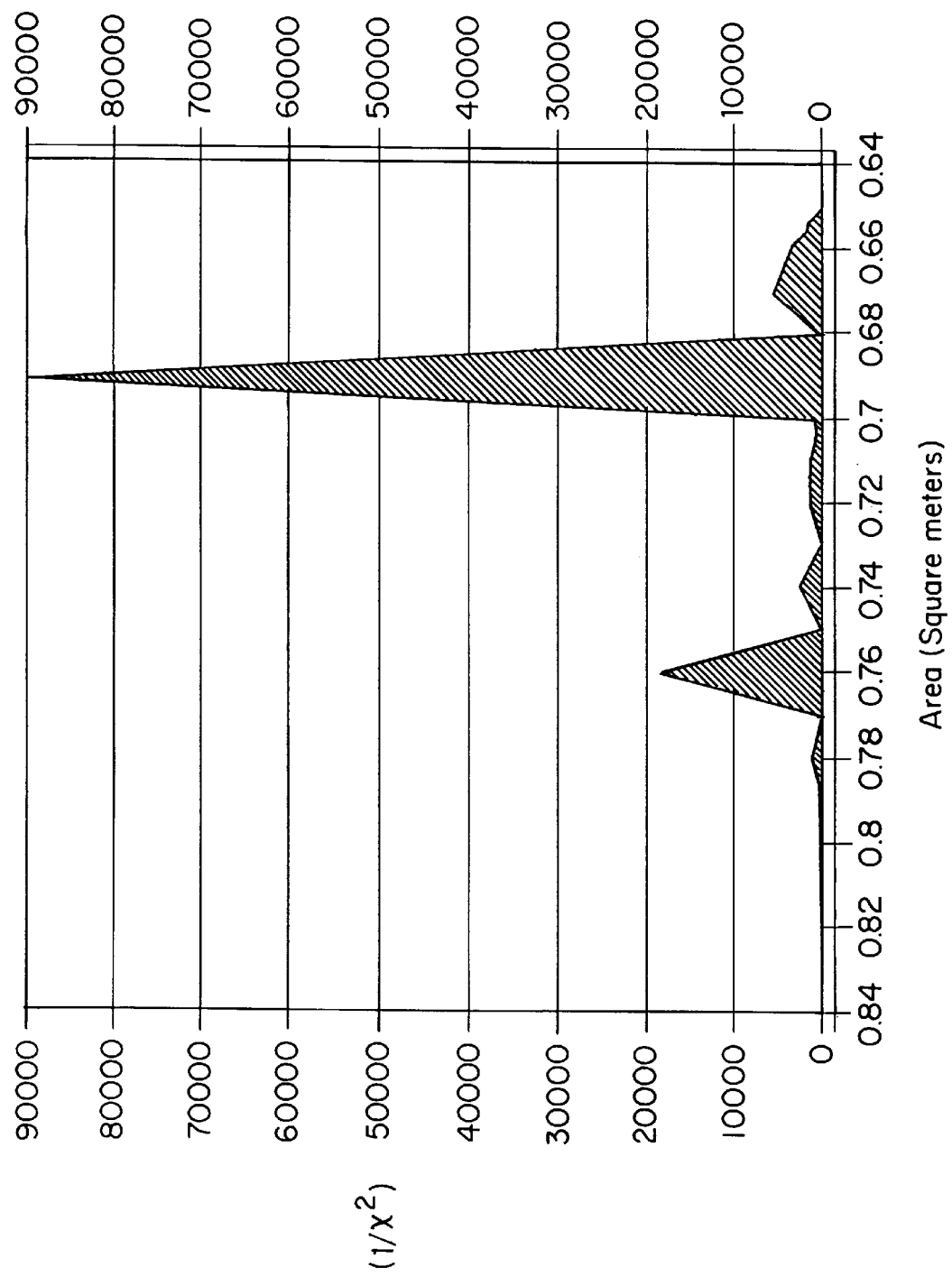

FIG. 4A shows an example of the two-dimensional $\chi^{-2}(A,T)$ surface. Localized peaks in $\chi^{-2}(A,T)$ correspond to local minima of $\chi^2(A,T)$. The $\chi^{-2}(A,T)$ surface is shown instead of the $\chi^2(A,T)$ surface because the local peaks are easier to visualize than local minima. It will be understood that $\chi^{-2}(A,T)$ is functionally equivalent to $\chi^2(A,T)$ for the purposes of FIG. 4A. FIGS. 4B and 4C are projections of the $\chi^{-2}$ surface on to the temperature and area axes respectively. It should be noted that the largest peaks in $\chi^{-2}$ (deepest minima in $\chi^2$) occur at $T^* = 251$ K and $A^* = 0.69$ m$^2$. This agrees very well with the true values of $T = 249.02$ K, $A = 0.732$ m$^2$ used in the actual measurements. For this plot the optical sensor measured in $L = 3$ bands and the model emissivity function used was $\epsilon_M = a + b\lambda$, which corresponds to $N = 2$.

While this invention has been particularly shown and described with references to preferred embodiments thereof, it will be understood by those skilled in the art that various changes in form and details may be made therein without departing from the spirit and scope of the invention as defined by the appended claims.

The invention claimed is:

1. A method for estimating area of a target surface in a processing region, comprising:

providing a detector for receiving radiation from the processing region;

providing in the processing region a reflecting surface having a known emissivity characteristic and temperature;

positioning the detector to receive ambient background radiation in the processing region, the ambient background radiation being reflected from the reflecting surface;

using the known emissivity characteristic and temperature of the reflecting surface, generating a background signal indicative of the received ambient background radiation in the processing region;

positioning the detector to receive radiation from the target surface;

using the detector, sensing radiation from the target surface within a plurality of wavelength bands;

for each wavelength band, computing a measured emissivity of the target surface as a function of the area of the target surface using the sensed power within the wavelength band, said computing comprising using the background signal to account for the ambient background radiation in the processing region;

generating an expression for a model emissivity of the target surface as a function of wavelength of radiation from the target surface; and at each of a plurality of values for the area of the target surface within a predetermined range of the area of the target surface, minimizing a difference between the measured emissivity at each wavelength band and the corresponding model emissivity at the same wavelength band for each of the wavelength bands, the estimated value for the area of the target surface being a value at which the difference is a minimum.

2. The method of claim 1 wherein the step of minimizing a difference comprises generating a least sum of squares of the differences between the measured emissivity at each wavelength band and the corresponding model emissivity at the same wavelength band.

3. The method of claim 1 wherein the step of minimizing a difference comprises computing a value for an unknown constant coefficient in the expression for the model emissivity.

4. The method of claim 1 wherein the expression for the model emissivity is an inverse square root function of wavelength having a single unknown constant coefficient.

5. The method of claim 1 wherein the expression for the model emissivity is a linear function of wavelength having two unknown constant coefficients.

6. The method of claim 1 wherein the expression for the model emissivity follows a power law function of wavelength.

7. The method of claim 1 wherein power in radiation from the target surface is sensed in not more than two wavelength bands.

8. The method of claim 1 wherein power in radiation from the target surface is sensed in not more than three wavelength bands.

9. The method of claim 1 wherein the expression for model emissivity includes not more than one unknown constant coefficient.

10. A method for estimating the area of a target surface, comprising:

receiving radiation from the target surface with a plurality of detectors, each detector sensing power of radiation within a particular respective wavelength band;

for each wavelength band, computing a measured emissivity of the target surface as a function of target surface area using the sensed power within the wavelength band;

generating an expression for a model emissivity of the target surface as a function of wavelength of radiation from the target surface; and at each of a plurality of area values within a predetermined range of area values, minimizing a difference between the measured emissivity at each wavelength band and the corresponding model emissivity at the same wavelength band for each of the wavelength bands, the area of the target surface being an area at which the difference is a minimum.

11. A method for estimating temperature, area and emissivity of a target surface, comprising:

receiving radiation from the target surface with a plurality of detectors, each detector sensing power of radiation within a particular respective wavelength band;

for each wavelength band, computing a measured emissivity of the target surface as a function of target surface temperature and area using the sensed power within the wavelength band;

generating an expression for a model emissivity of the target surface as a function of wavelength of radiation from the target surface, said expression including an unknown coefficient;

at each of a plurality of temperature values and area values within predetermined ranges of temperature values and area values, minimizing a difference between the measured emissivity at each wavelength band and the corresponding model emissivity at the same wavelength band for each of the wavelength bands, the estimated temperature and area of the target surface being a temperature and area at which the difference is a minimum; and using the estimated temperature and area, computing the unknown coefficient to generate an expression for emissivity of the target surface as a function of wavelength.

12. An apparatus for estimating area of a target surface in a processing region, comprising:

a detector for receiving radiation from the processing region and generating signals indicative of the received radiation;

a reflecting surface located within the processing region for reflecting ambient background radiation in the processing region, the reflecting surface having a known emissivity characteristic and temperature;

means for positioning the detector to receive the reflected ambient background radiation from the reflecting surface, the detector generating a background signal indicative of the reflected ambient background radiation using the known emissivity characteristic and temperature of the reflecting surface;

means for positioning the detector to receive radiation from the target surface, said detector generating a plurality of signals indicative of radiation received from the target surface in a plurality of respective wavelength bands; and a processor coupled to the detector, said processor comprising: means for receiving from the detector the background signal indicative of ambient background radiation;

means for receiving the signals indicative of radiation received from the target surface;

means for computing, for each wavelength band, a measured emissivity of the target surface as a function of the area of the target surface using the radiation from the target surface sensed within the wavelength band, said means for computing using the background signal to account for the ambient background radiation in the sensed radiation from the target surface;

means for generating an expression for a model emissivity of the target surface as a function of wavelength of radiation from the target surface; and means for minimizing, at each of a plurality of values of the area of the target surface within a predetermined range of values of the area of the target surface, a difference between the measured emissivity at each wavelength band and the corresponding model emissivity at the same wavelength band for each of the wavelength bands, the estimated value for the area of the target surface being a value at which the difference is a minimum.

13. The apparatus of claim 12 wherein the means for minimizing generates a least sum of squares of the differences between the measured emissivity at each wavelength band and the corresponding model emissivity at the same wavelength band.

14. The apparatus of claim 12 wherein the means for minimizing computes a value for an unknown constant coefficient in the expression for the model emissivity.

15. The apparatus of claim 12 wherein the processor further comprises means for computing a value for an unknown constant coefficient to complete the expression for emissivity of the target surface as a function of wavelength.

16. The apparatus of claim 12 wherein the expression for the model emissivity is an inverse square root function of wavelength having a single unknown constant coefficient.

17. The apparatus of claim 12 wherein the expression for the model emissivity is a linear function of wavelength having two unknown constant coefficients.

18. The apparatus of claim 12 wherein the expression for the model emissivity follows a power law function of wavelength.

19. The apparatus of claim 12 wherein the detectors sense power in not more than two wavelength bands.

20. The apparatus of claim 12 wherein the detectors sense power in not more than three wavelength bands.

21. The apparatus of claim 12 wherein the expression for the model emissivity includes not more than one unknown constant coefficient.

22. The apparatus of claim 12 wherein the expression for the model emissivity includes not more than two unknown constant coefficient.

23. A method for estimating area of a target surface, comprising:

receiving reflected ambient background radiation with a detector from a reflecting surface having a known emissivity characteristic and temperature to characterize ambient background radiation in a region near the target surface;

receiving radiation from the target surface with a plurality of detectors, each detector sensing power of radiation within a particular respective wavelength band;

for each wavelength band, computing a measured emissivity of the target surface as a function of the area of the target surface using the sensed power within the wavelength band, said computing comprising accounting for the amount of power of ambient background radiation in the sensed power;

generating an expression for a model emissivity of the target surface as a function of wavelength of radiation from the target surface; and at each of a plurality of values for the area of the target surface within a predetermined range of values of the area of the target surface, minimizing a difference between the measured emissivity at each wavelength band and the corresponding model emissivity at the same wavelength band for each of the wavelength bands, the estimated value for the area of the target surface being a value at which the difference is a minimum.

24. An apparatus for estimating area of a target surface, comprising:

a plurality of detectors for receiving radiation from the target surface and for receiving reflected ambient background radiation in a region near the target surface from a reflecting surface having a known emissivity characteristic and temperature, each detector being adapted to sense power of radiation within a particular respective wavelength band and being adapted to generate signals indicative of the sensed power; and a processor coupled to the detectors, said processor comprising:

means for receiving a signal indicative of ambient background radiation reflected from the reflecting surface to characterize the ambient background radiation in die region near the target surface;

means for receiving a signal indicative of sensed power in radiation from the target surface;

means for computing, for each wavelength band, a measured emissivity of the target surface as a function of the area of the target surface using the power sensed within the wavelength band, said means for computing accounting for the amount of power of ambient background radiation in the sensed power;

means for generating an expression for a model emissivity of the target surface as a function of wavelength of radiation from the target surface; and means for minimizing, at each of a plurality of values of the area of the target surface within a predetermined range of values of the area of the target surface, a difference between the measured emissivity at each wavelength band and the corresponding model emissivity at the same wavelength band for each of the wavelength bands, the estimated value for the area of the target surface being a value at which the difference is a minimum.

25. A method for estimating area of a target surface in a processing region, comprising:

providing a detector for receiving radiation from the processing region;

providing a reflecting surface in the processing region, said reflecting surface having a known emissivity characteristic and temperature;

positioning the detector to receive ambient background radiation in the processing region, the received ambient background radiation being reflected from the reflecting surface;

using the known emissivity characteristic and temperature of the reflecting surface, generating a background signal indicative of the ambient background radiation in the processing region;

positioning the detector to receive radiation from the target surface;

generating a signal indicative of the received radiation from the target surface; and computing an estimate of the area of the target surface using the background signal and the signal indicative of the received radiation from the target surface.

26. The method of claim 25 wherein the detector receives radiation from the target surface in a plurality of wavelength bands and a plurality of respective signals indicative of the received radiation from the target surface in the respective wavelength bands are generated.

27. The method of claim 26 wherein the signals are generated for not more than two wavelength bands.

28. The method of claim 26 wherein the signals are generated for not more than three wavelength bands.

29. The method of claim 26 wherein the step of computing an estimate comprises:

for each wavelength band, computing a measured emissivity of the target surface as a function of the area of the target surface using the signal indicative of the received radiation in the wavelength band, said computing comprising using the background signal to account for the ambient background radiation in the processing region;

generating an expression for a model emissivity of the target surface as a function of wavelength of radiation from the target surface; and at each of a plurality of values for the unknown target surface parameter within a predetermined range of the unknown target surface parameter, minimizing a difference between the measured emissivity at each wavelength band and the corresponding model emissivity at the same wavelength band for each of the wavelength bands, the estimated value for the unknown parameter being a value at which the difference is a minimum.

30. An apparatus for estimating an area of a target surface in a processing region, comprising:

a detector for receiving radiation from the processing region and generating signals indicative of the received radiation;

a reflecting surface located within the processing region for reflecting ambient background radiation in the processing region, said reflecting surface having a known emissivity characteristic and temperature;

means for positioning the detector to receive the reflected ambient background radiation from the reflecting surface, the detector, using the known emissivity characteristic and temperature of the reflecting surface, generating a background signal indicative of the reflected ambient background radiation;

means for positioning the detector to receive radiation from the target surface, said detector generating a signal indicative of radiation received from the target surface; and a processor coupled to the detector, said processor comprising:

means for receiving from the detector the background signal indicative of ambient background radiation in the processing region;

means for receiving the signal indicative of radiation received from the target surface; and means for computing an estimate of the area of the target surface using the background signal and the signal indicative of radiation received from the target surface.

31. The apparatus of claim 30 wherein the detector receives radiation from the target surface in a plurality of wavelength bands and generates a plurality of respective signals indicative of radiation received from the target surface in each of the respective wavelength bands.

32. The apparatus of claim 31 wherein the detector generates the signals for radiation received from the target surface in no more than two wavelength bands.

33. The apparatus of claim 31 wherein the detector generates the signals for radiation received from the target surface in no more than three wavelength bands.

34. The apparatus of claim 31 wherein the means for receiving the signal indicative of radiation received from the target surface receives the plurality of signals indicative of radiation received from the target surface in the plurality of respective wavelength bands.

35. The apparatus of claim 34 wherein the means for computing the estimate of the unknown parameter comprises:

means for computing for each wavelength band a measured emissivity of the target surface as a function of the unknown target surface parameter using the radiation from the target surface sensed within the wavelength band, said means for computing using the background signal to account for the ambient background radiation in the sensed radiation from the target surface;

means for generating an expression for a model emissivity of the target surface as a function of wavelength of radiation from the target surface; and means for minimizing, at each of a plurality of values of the unknown target surface parameter within a predetermined range of values of the unknown target surface parameter, a difference between the measured emissivity at each wavelength band and the corresponding model emissivity at the same wavelength band for each of the wavelength bands, the estimated value for the unknown parameter of the target surface being a value at which the difference is a minimum.

* * * * *

UNITED STATES PATENT AND TRADEMARK OFFICE
CERTIFICATE OF CORRECTION

PATENT NO. : 5,868,496

DATED : February 9, 1999

INVENTOR(S) : Richard M. Spitzberg

It is certified that error appears in the above-identified patent and that said Letters Patent is hereby corrected as shown below:

In Claim 24, at column 19, line 29, delete "die" and replace it with - - the - -.

Signed and Sealed this

Twentieth Day of July, 1999

Attest:

Q. TODD DICKINSON

Attesting Officer

Acting Commissioner of Patents and Trademarks